Dec. 29, 1959 W. L. McGUINNESS 2,918,960
TRACTION ANTISKID DEVICES
Filed Feb. 18, 1957 2 Sheets-Sheet 1
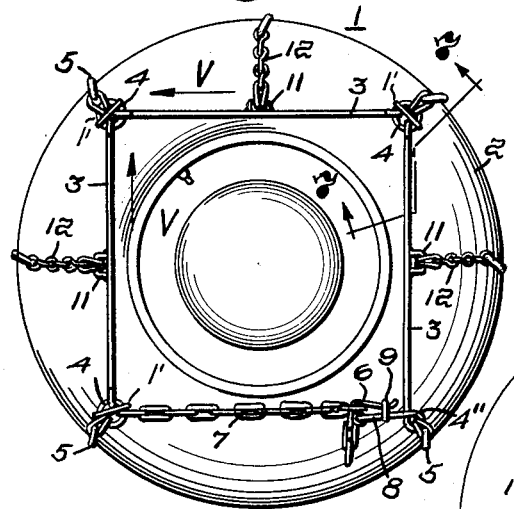
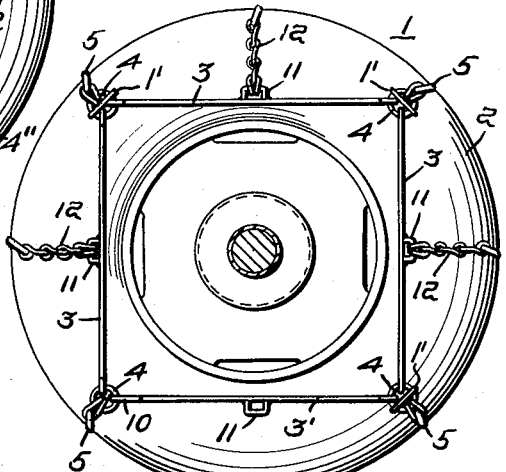
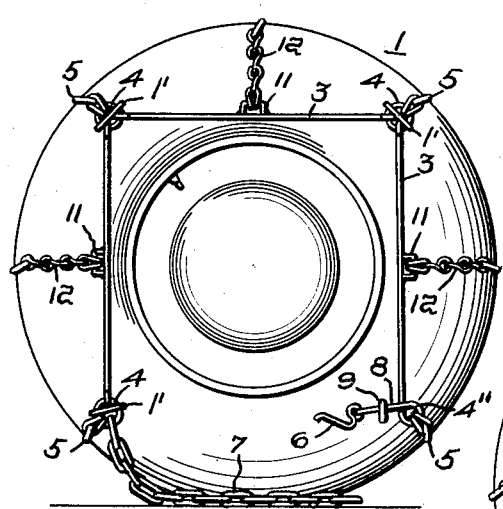
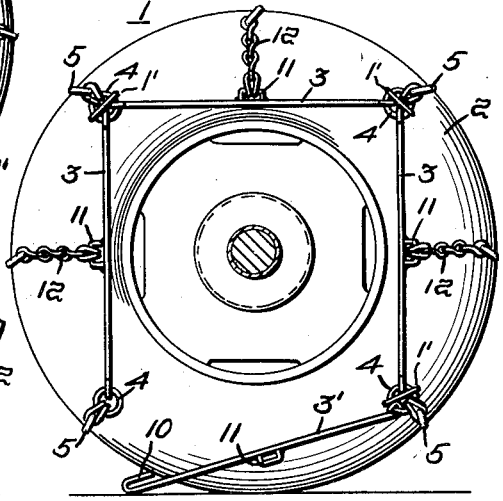
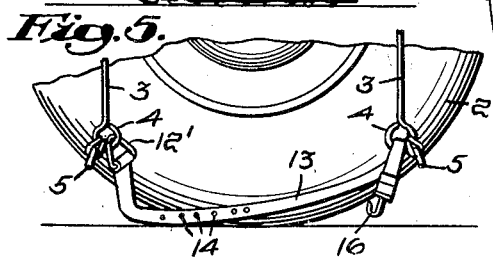
Inventor:
Walter L. McGuinness,
by [signature] Attorney

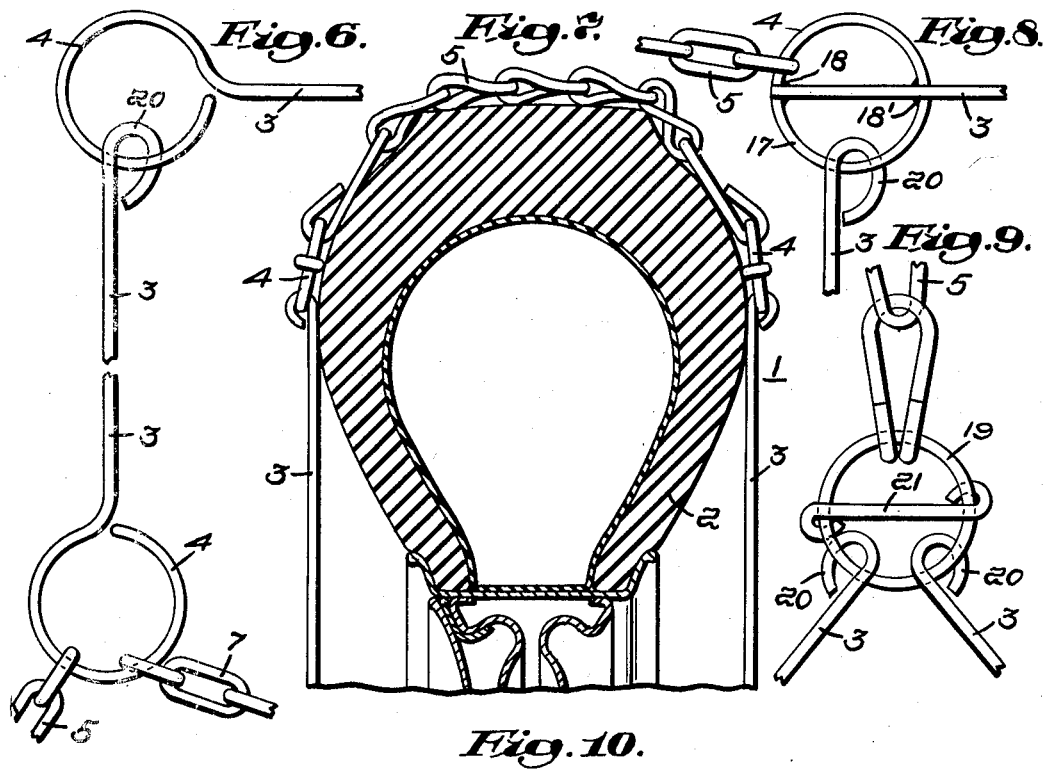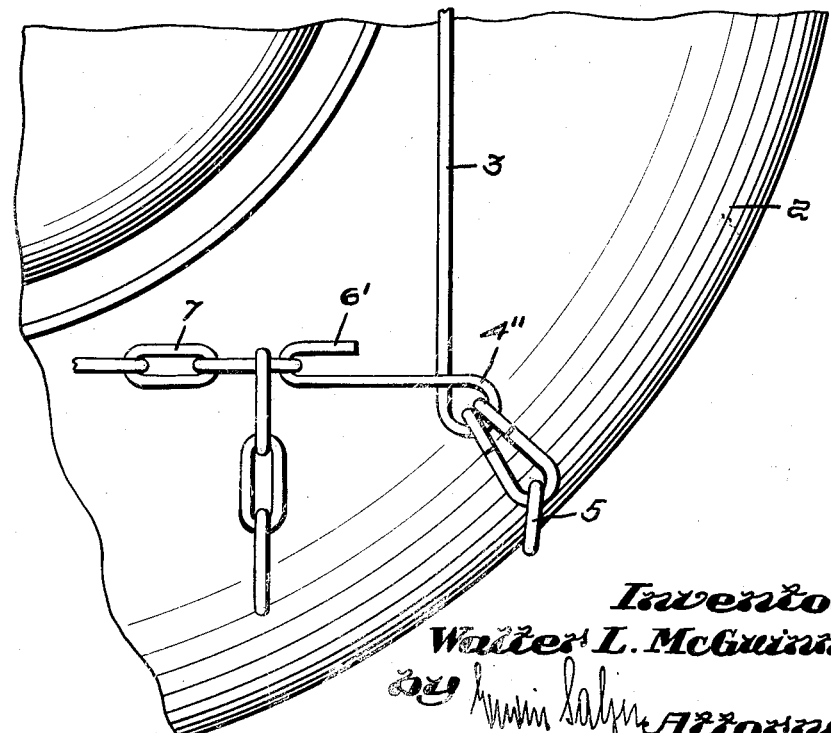

United States Patent Office 2,918,960
Patented Dec. 29, 1959

2,918,960

TRACTION ANTISKID DEVICES

Walter L. McGuinness, Waltham, Mass.

Application February 18, 1957, Serial No. 640,884

2 Claims. (Cl. 152—233)

This invention relates to snow-chain-type traction antiskid devices for wheels of motorized vehicles, and more particularly to traction antiskid devices for motor cars.

It is one object of the invention to provide a device of this character which lends itself to be readily mounted on solid disc wheels, i.e. disc wheels not provided with spaced slots around the outer margin thereof.

Another object of the invention is to provide a device of the aforementioned character which can more readily and conveniently be mounted on car wheels than conventional sets of snow chains.

Still another object of the invention is to provide a very flexible traction antiskid device, i.e. one that lends itself for emergency use and that can readily be adapted for medium and even heavy duty.

A further object of the invention is to provide a medium duty traction antiskid device particularly adapted for suburban use which is much lighter in weight than conventional car tire or snow chains but much more effective than so-called strap-on chains whose use is limited to emergencies and which can only be mounted on slotted wheels.

The foregoing and other general and special objects of the invention and advantages thereof will become more apparent from the ensuing particular description of several embodiments thereof, as illustrated in the accompanying drawing, wherein Fig. 1 is a front view of a motor car wheel with an anti-skid device embodying this invention mounted thereon;

Fig. 2 is a rear view of the same car wheel with the same device as shown in Fig. 1 mounted thereon;

Fig. 3 shows the same parts as Fig. 1 in the process of being mounted on, or removed from, the car wheel;

Fig. 4 shows the same parts as Fig. 2 in the process of being mounted on, or removed from, the wheel;

Fig. 5 is a front view of a modification of the structure shown in Figs. 1 to 4 and shows in front view a part of a motor car wheel and a part of the antiskid device;

Fig. 6 is a front elevation and shows some parts of the structure of Figs. 1 to 4 on a larger scale;

Fig. 7 is a section along 7—7 of Fig. 1, this section being drawn on a larger scale than Fig. 1;

Fig. 8 is a front view showing a modification of the detail shown in Fig. 6;

Fig. 9 is a front view showing another modification of the detail shown in Fig. 6; and Fig. 10 is a front view of a wheel for a motor car showing a modification of the chain lock shown in Fig. 3.

Referring now to the drawings, and more particularly to Figs. 1 to 4 thereof, numeral 1 has been applied to generally indicate a wheel of a motor car on which the tire 2 has been mounted. The antiskid device comprises seven rods 3 and 3′. The three rods 3 on the front of the motor car wheel 1 enclose a square surface, each of these three rods being equal in length. Each rod 3 defines a segment on wheel 1. The three rods 3 on the rear of wheel 1 are arranged in the same way as the three rods 3 on the front of wheel 1. Each end of each rod 3 is annularly bent, and juxtaposed bent ends of rods 3 engage to form a hinging connection between the rods. The way in which angularly arranged rod ends engage, or interlink, can best be seen in Fig. 6 where upper horizontal front rod 3 is shown to comprise a left annular end 4 formed by bending rod 3 in substantially circular fashion. The upper end of the vertical rod 3 forms a loop 20 engaging ring 4 in such a way as to preclude separation of both rods 3. As also shown in Fig. 6 the lower end of vertical rod 3 is bent to form a ring 4. The rings 4 of rods 3 may be closed by welds, if des'red, but provision of ring closing welds is not vitally important, provided that rods 3 are made of a relatively hard steel precluding opening of rings 4 under the action of the forces acting upon rings 4 and loop 20. There are three rings 4 on the front of wheel 1, and four rings 4 on the rear of wheel 1. Each ring 4 on the front of wheel 1 is connected by an antiskid cross-chain 5 to one of the four rings 4 on the rear of wheel 1. Cross-chains 5 may be of any appropriate design, as generally used in snow chain structures. The lower end of the vertical right front rod 3 as seen in Figs. 1 and 3 is bent to form a ring 4″ and projects beyond ring 4″ and hingedly supports a hook member 6. The lower end of the vertical left front rod 3 forms the ring 4 to which the last link of a chain 7 is attached. Hook 6 hinged to the extension 8 of vertical right front rod 3 is adapted to engage, i.e. to be hooked into, one of the links in chain 7. Fig. 1 shows hook 6 engaging, or hooked into, one link of chain 7 in such a way as to keep chain 7 perfectly taut. Chain 7 is subjected to a stress tending to pivot hook 6 in counter-clockwise direction, as seen in Fig. 1. A ring member 9 mounted on extension 8 and engaging the right end of hook 6 precludes hook 6 from being pivoted in counter-clockwise direction. As shown in Fig. 3 removal of ring 9 permits pivotal movement of hook 6 in counter-clockwise direction, whereupon chain 7 may be disengaged from hook 6. As shown in Fig. 4 one end of rod 3′ is hingedly supported by one of the rings 4 formed by one of the vertical rear rods 3, whereas the opposite end of rod 3 is bent to form a hook 10. Hook 10 is adapted to engage a lower annular end 4 of one of the vertical rear rods 3 on wheel 1, and Fig. 2 shows hook 10 in the position engaging, or hooked into, the lower annual end of one of the vertical rear rods 3.

Each of rods 3 may be provided, if desired, with a loop-shaped element 11 situated midway between the ends thereof. Each element 11 on the front of wheel 1 may be connected by a cross-chain 12, or by an equivalent friction antiskid element of vulcanized rubber, with a corresponding element 11 on the rear of wheel 1. Cross-chains 12 may safely be omitted for relatively light or medium traction such as, for instance, generally required in suburban use. Cross-chains 12 are not needed unless the arrangement is intended for heavy duty, such as cross-country driving after heavy snowfalls.

Mounting of this antiskid device on the wheel of a motor vehicle is effected as follows: The two vertical back or rear rods 3 are being used as convenient handles for manipulating the whole structure. These rods are first being grasped, each with one hand of the operator, and used to lift or raise the parts which are intended to be located on the rear side of the wheel 1 to the rear side of the wheel. To this end the horizontal rod 3 on the rear of wheel 1 is simply raised and shoved over the apex portion of tire 2, and then both vertical rear or back rods 3 are dropped or released, thus assuming the position shown in Fig. 4. Thereafter hook 10 assuming the position shown in Fig. 4 is hooked into the ring 4 immediately adjacent thereto. This can be achieved very conveniently since hook 4 is situated relatively far radially outwardly, i.e. close to the periphery of tire 2. Fig. 2 shows horizontal rod 3' in position, i.e. with the hook 10 thereof in engagement with ring 4 on one of the vertical rods 3. Next hook 6 is moved into one of the links of chain 7 and ring 9 is moved into the position shown in Fig. 1, thus firmly securing the entire antiskid structure to wheel 1.

As shown in Figs. 1–4 each of rings 4 may be provided with a transverse separation bar 1' each separating two of the three elements 3, 3, 5 hinged to each of rings 4 from the third element. The presence of bars 1' is useful, but they may be dispensed with, as indicated in Fig. 6.

Each cross-chain 5 exerts a radially outward pull on the ring 4 or 4", respectively, to which it is attached. The pull exerted by chains 5 forms two component forces indicated in Fig. 1 by the two vectors V. It is apparent that the forces indicated by vectors V subject rods 3, 3' and chain 7 to tensional stresses. The tensil strength of such materials as steel being very high, rods 3 can be relatively thin and light without sacrificing life and strength. The cost of manufacturing the rod structures 3 and 3' are considerably less than those of manufacturing similar elements formed of a length of a chain.

In the modification of the structure shown in Fig. 5 the lower end of the vertical left front rod 3 is provided with a ring 4 engaged by a triangular strap holder 12'. Strap 13 is supported by strap holder 12' and provided with a plurality of perforations 14. The lower end of the vertical right front rod 3 is provided with a ring 4 through which strap 13 is threaded. Strap 13 is provided with a hook 16 adapted to engage selectively one of the perforations 14 in strap 13.

It will be apparent from the foregoing that strap 13 is substantially an equivalent of chain 7 shown in the embodiment of the invention illustrated in Figs. 1 to 4, and intended to take the place of chain 7.

It will be apparent from Fig. 1 that the left upper corner of the square formed by parts 7, 3, 3, 3 comprises a hinging connection between chain 5, left vertical front rod 3 and upper horizontal front rod 3. This hinging connection can be modified as shown in Fig. 8. According to Fig. 8 the upper horizontal front rod 3 extends across a ring member 17, and is welded to it at two points 18 and 18', thus subdividing the ring member 17 into two equal parts. The upper part of ring member 17 is engaged by one end of an antiskid cross-chain 5, whereas the lower part of ring member 17 is engaged by the upper bent part 20 of the left vertical front rod 3. Other corners of the square frame supporting cross-chains 5 may be constructed in the same way as shown in Fig. 8.

The hinge connection shown in Fig. 9 comprises an annular member 19 supporting a bar member 21 by which it is subdivided into two equal portions. The ends of bar member 21 are twisted to secure bar member 21 to member 19. The upper portion of annular member 19 is engaged by one end of one of the cross-chains 5, whereas the lower portion of annular member 19 is engaged by the two ends of two rod members 3 bent to form loops 20.

Fig. 10 shows a modification of the locking mechanism shown in the lower right hand portions of Figs. 1 and 3. According to Fig. 10 the lower end of the vertical right front rod 3 is first bent to form a circular loop 4" and then bent to form a hook 6'. Hook 6' is resilient by virtue of the presence of loop 4" and able to maintain chain 7 in position without need of the locking ring 9 shown in Figs. 1 and 3. The locking mechanism shown in Fig. 10 does not require any hinge means for hook 6', the resiliency of the free end of rod 3 providing sufficient give to achieve a taut connection between chain 7 and hook 6'.

In all the structures which have been described above the cross-chains 5 are being held in position by two wheel-hugging polygon linkages. Each cross-chain is directly attached with one end thereof to one corner of a polygon linkage on one side of the wheel and with the other end thereof to one corner of a polygon linkage on the other side of the wheel. Each of the four cross-chains 5 is subjected to a stress equal to the sum of the vectors in the polygon linkage on one side of the wheel and in the polygon linkage on the other side of the wheel at the points of attachment of the respective cross-chain 5 to said polygon linkages.

It will be understood that while I have illustrated and described herein several preferred embodiments of my invention, various alterations may be made in the details thereof without departing from the spirit and scope of my invention as defined in the appended claims.

I claim as my invention:

1. An antiskid traction device for wheels of motorized vehicles comprising a substantially square frame for hugging the rear side of a wheel, said rear-side-hugging frame including four straight rods of fixed length enclosing substantially right angles to form four corners, annular means on the ends of said rods at said four corners, and an eye-and-hook lock on one of said four corners adapted to selectively open and close said rear-side-hugging frame; a substantially square frame for hugging the front side of a wheel, said front side hugging frame including three straight rods of fixed length enclosing substantially right angles to form four corners, annular means on the ends of said rods at said four corners, and a pliable element adapted to form a taut tie of variable length between spaced ends of two of said three rods; and four cross-chain means each directly engaging one of said annular means on said rear-side-hugging frame and each directly engaging one of said annular means on said front-side-hugging frame.

2. An antiskid traction device for wheels of motorized vehicles comprising a substantially square structure for hugging the rear side of a wheel, said rear-side-hugging structure including four straight rods of fixed length enclosing substantially right angles and defining four corner regions, both ends of three of said rods being bent in eye form and the fourth of said rods being bent on one end to form a hook and on the other end to form an eye, said rear-side-hugging structure further comprising annular link means arranged in said four corner regions to interconnect said rods; a substantially square structure for hugging the front side of a wheel, said front-side-hugging structure including three straight rods of fixed length having both ends thereof bent in eye-form and arranged at substantially right angles and defining four corner regions, a chain adapted to form a taut tie of variable length between spaced ends of two of said three rods, and annular link means for connecting the ends of said two rods remote from said chain to the third of said three rods; and four-cross-chain means each directly connecting one corner region of said rear-side-hugging structure to one corner region of said front-side-hugging structure.

References Cited in the file of this patent

UNITED STATES PATENTS

| | | |
|---|---|---|
| 1,053,504 | Harris | Feb. 18, 1913 |
| 1,316,873 | Bernot | Sept. 23, 1919 |
| 2,315,838 | Bryon | Apr. 6, 1943 |
| 2,711,770 | Conoscente et al. | June 28, 1955 |

FOREIGN PATENTS

| | | |
|---|---|---|
| 335,903 | France | Dec. 21, 1903 |